US006904591B2

(12) United States Patent
Grala

(10) Patent No.: US 6,904,591 B2
(45) Date of Patent: Jun. 7, 2005

(54) SOFTWARE DEVELOPMENT SYSTEM FOR EDITABLE EXECUTABLES

(75) Inventor: Darius A. Grala, Weston, MA (US)

(73) Assignee: OZ Development, Inc., Westborough, MA (US)

( * ) Notice: Subject to any disclaimer, the term of this patent is extended or adjusted under 35 U.S.C. 154(b) by 81 days.

(21) Appl. No.: 10/285,946

(22) Filed: Nov. 1, 2002

(65) Prior Publication Data

US 2004/0088679 A1 May 6, 2004

(51) Int. Cl.[7] .............................................. G06F 9/45
(52) U.S. Cl. ....................... 717/159; 717/139; 717/140; 717/146; 380/237
(58) Field of Search ................. 717/108–118, 136–162, 717/168–178, 152–154; 705/54; 713/200

(56) References Cited

U.S. PATENT DOCUMENTS

| 5,287,548 A | | 2/1994 | Flood et al. |
| 5,291,598 A | * | 3/1994 | Grundy ....................... 713/200 |
| 5,586,328 A | * | 12/1996 | Caron et al. ................. 717/146 |
| 5,848,274 A | | 12/1998 | Hamby et al. |
| 5,920,718 A | * | 7/1999 | Uczekaj et al. ............. 717/109 |
| 5,933,498 A | * | 8/1999 | Schneck et al. ............... 705/54 |
| 6,182,281 B1 | | 1/2001 | Nackman et al. |
| 6,186,677 B1 | * | 2/2001 | Angel et al. ................. 717/118 |
| 6,269,475 B1 | | 7/2001 | Farrell et al. |
| 6,308,317 B1 | * | 10/2001 | Wilkinson et al. .......... 717/139 |
| 6,334,213 B1 | * | 12/2001 | Li ............................... 717/170 |
| 6,347,398 B1 | * | 2/2002 | Parthasarathy et al. ..... 717/178 |
| 6,587,939 B1 | * | 7/2003 | Takano ........................ 712/210 |

* cited by examiner

*Primary Examiner*—Tuan Dam
*Assistant Examiner*—Chuck Kendall
(74) *Attorney, Agent, or Firm*—Clock Tower Law Group; Erik J Heels; Joshua D. Mather

(57) ABSTRACT

The invention provides a Software Development Program having a compiled programming language, Compiler for that language, and a built-in text Editor. The programming language has a block structure and simple syntax. The Software Development Program is distributed free to developers, but programs created with the Software Development Program must be licensed. In addition to machine-readable Object Code, Executable Files created with the Compiler include the embedded Source Code (including independent function libraries that help form an Executable Shell) from which they were created. Separate Source Code and Object Code files are not required. The Compiler edits the Executable Files directly, thereby eliminating the need for source code control.

23 Claims, 4 Drawing Sheets

SOFTWARE DEVELOPMENT SYSTEM FOR EDITABLE EXECUTABLES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2002 OZ Development, Inc.

BACKGROUND OF THE INVENTION

1. Field of the Invention

The invention relates to software development programs. More specifically, the invention relates to software that is a hybrid between a software compiler and a software interpreter. Like a software compiler, the software that is the subject of the invention creates object code. Unlike conventional compilers (and similar to interpreters), the invention does not separate human-readable source code from machine-readable object code. Instead, with the invention, executable files are edited directly.

2. Description of Prior Art

Object Code, Assemblers, Interpreters, and Compilers.

Computer programs define a series of steps to be taken by a computer and are in the form of object code (or machine code). Machine code, however, is not easily readable by humans. Assemblers were developed to translate human-readable assembly language into machine-readable machine code, but assembly language does not provide a high enough level of abstraction to software developers. As such, higher-level programming languages were developed to bridge the gap between human-readable source code and machine-readable object code. High-level programming languages include interpreted languages and compiled languages. Interpreted languages are written in human-readable source code and are translated to object code at run-time by an interpreter. Interpreted languages include Lisp, Scheme, and so-called scripting languages such as JavaScript.™, VisualBasic.RTM, PERL, and the like. Compiled languages are written in human-readable source code and are translated into object code by a compiler. Compiled languages include block-structured languages such as PASCAL, C, and C++. Compared with interpretation, compilation provides an increase in the efficiency of program execution, because with an interpreter, the source code is translated to object code each time the program is run (i.e. at run time), whereas with a compiler the source code is compiled into object code once. On the other hand, source code control (i.e. keeping track of which version of source code produced which object code) is easier with interpretation, since the source code is always available at run time.

Source code control for compiled languages, however, can be quite challenging. For complex compiled programs, dozens or even hundreds of separate source code files are required to properly compile a single object code file. As a result, software developers have procedures for determining when a particular "version" of a program should be defined. Different versions of source code are defined for each major release (e.g. alpha, beta, v1.0, v2.0), interim/patch release (e.g. v1.1, v2.2), or bug fix release (e.g. v1.1.1, v2.2.1). If a user of a particular version of a program has a problem, the user has to be able to communicate to the software developer which particular version of the program has the problem, and the software developer has to be able to correlate the particular program with a set of source code files. If the software developer has not been diligent about defining and ensuring the integrity of each version of its program, problems can arise for both the software developer and the end users.

Source code control is especially important for customized software programs. Customized software programs, as opposed to off-the-shelf consumer software, are typically written by small software development firms or independent contractors. In some cases, customized software programs that are delivered to clients include both object code and source code. Frequently, clients prefer to edit the source code in order to customize it or integrate it into an existing computing environment. In such cases, it is easy for the client to develop source code control problems. If the developer is called to the client's facility to assist with debugging a customized software program, the developer and the client may likely have different versions of source code and object code, and neither would be able to easily determine where changes had been made. Furthermore, the client or the developer may not have legal copies of the required compiler. If the developer needs to perform two separate customizations at two separate client sites, he/she may need to install two separate copies of the required compiler. Compilers, however, are expensive, and installing a compiler on multiple computers typically violates the software license terms of the compiler vendor. In some cases, the software developer's only option may be to try to decompile the object code into source code. The problem with decompiling software, however, is that the software developer's comments in the source code will not be recreated by the decompilation process. Formatting such as indenting, which makes source code easier to read for humans, is also lost by decompiling. Another option is for the software developer to use a resource editor to edit certain components of the customized software program. Resource editors, however, are not suitable when anything other than a cosmetic change is required.

Furthermore, as programs became more complex, programming languages became more complex, and numerous software design strategies emerged. For example, when compilation times increased, techniques were developed to make compilation faster and more efficient. Integrated development environments for object-oriented languages (such as Smalltalk.™, Objective-O, C++ and Java.™) offer developers the ability to build and design complex component-based programs in a given programming language. Component-based frameworks and protocols (such as ActiveX/COM.RTM, JavaBeans.™, and CORBA) provide standard rules and interfaces for regulating the interaction of heterogeneous components. "Visual" authoring tools (such as Sun Microsystem's.RTM Javastudio.™ and Symantec's.RTM Visual Cafe) provide graphic user-interfaces for creating and configuring component-based programs in a given object-oriented language. Script-oriented authoring tools (such as Apple's.RTM Hypertalk or Macromedia's.R™ Director.RTM) provide environments for developing multimedia programs using the tools' built-in functionality and single-purpose, proprietary scripting languages.

Unfortunately, these strategies frequently result in added complexity for the software developer, in general, and for customized software developers, in particular. Many customized software programs required only a small subset of the functions that are available to software developers today.

Prior Art Chronology

A number of patents have addressed these issues. U.S. Pat. No. 5,287,548 (Flood et al., Feb. 15, 1994) discloses a "Programmable controller having a stored program with both machine language instructions and source code data." The control program that is stored in the controller includes both compiled machine language instructions and tokenized version of the source code from which certain machine language instructions were compiled. The source code is provided only for the portion of the machine language program that cannot be easily decompiled to produce the corresponding source code. The invention can be distinguished from the '548 patent because there is no such division of the source code in the invention. As such, the '548 patent teaches away from what is disclosed herein.

U.S. Pat. No. 5,848,274 (Hamby et al., Dec. 8, 1988) discloses an "Incremental byte code compilation system" for distributed target-independent software programs such as Java applets. The '274 patent is trying to solve the problem of repeatedly recompiling source code into object code. To the extent that this patent discloses a compiler, it is related to the invention. While the invention is also trying to simplify the creation and management of object code, it achieves this result in a substantially different way than the '274 patent.

U.S. Pat. No. 6,182,281 (Nackman et al., Jan. 30, 2001) discloses "Incremental compilation of C++ programs." The '281 patent involves an enhanced compiler for compiling C++ programs without the use of forward declarations that are normally included in program header files.

U.S. Pat. No. 6,269,475 (Farrell et al., Jul. 31, 2002) discloses an "Interface for object oriented programming language." The '475 patent discloses an object programming language with editable object source code (FIG. 1, item 11), but the '475 patent deals with object-oriented programming techniques, not with editable object code.

While the prior art discloses several techniques for improving creation and management of object code, none of the improvements solve the problem of source code control. And although powerful software development techniques have been developed (such as visual authoring tools), none of these provides a development environment that is suited for the customized software developer who may need only a small subset of the functionality of any given software development program, tool, or environment.

Consequently, a need exists for a software development system that is suited to the customized software developer. Namely a software development system that 1) is affordable, 2) has a simple but powerful programming language, and 3) provides automatic source code control.

BRIEF SUMMARY OF THE INVENTION

The invention provides a Software Development Program having a compiled programming language, Compiler for that language, and a built-in text Editor. The Development Program is distributed free to developers, but programs created with the Software Development Program must be licensed. In addition to machine-readable Object Code, Executable Files created with the Compiler include the embedded Source Code (including independent function libraries that help form an Executable Shell) from which they were created. Separate Source Code and Object Code files are not required. The Compiler edits the Executable Files directly, thereby eliminating the need for source code control.

Objects

An object of the invention is to provide a Software Development Program that is affordable.

Another object of the invention is to provide a Software Development Program that has a simple but powerful programming language.

Another object of the invention is to provide a Software Development Program that has automatic source code control.

Features

Affordable

A feature of the invention is that the Software Development Program is distributed according to a licensing agreement whereby the Software Development Program is free but Executable Files created with the Software Development Program require license numbers. Users may use the Software Development Program to create Executable Files that can be run in either Demo Mode or License Mode. Users may run Executable Files created with the Software Development Program in Demo Mode to test, debug, and demonstrate the Executable Files. License Mode must be used for Executable Files created by the Software Development Program that are sold, used for internal production, used for business purposes, or put to any other commercial use. Users can run Executable Files in License Mode by obtaining a License Number from OZ Development and paying the applicable license fee. Executable Files created with the Software Development Program display a Notice Screen that prompts Users to enter a License Number. License Numbers can be purchased from the OZEXE web site (http://www.ozexe.com/) of via any communications network (such as phone, fax, online service, wireless, or the like), and when Users enter the License Number into the Notice Screen, the Notice Screen will not appear when Users subsequently run the Executable File on any licensed computer. New License Numbers must be purchased for each computer on which Executable Files created with the Software Development Program run.

Simple But Powerful Programming Language

Another feature of the invention is that the programming language has simple syntax. The invention's programming language is simple to learn yet powerful enough to build robust and sophisticated Executable Files.

Another feature of the invention is that the Software Development Program is configured with automatically included libraries. Prior software development programs incorporate hundreds of library functions. Often there will be a dozen or more functions that do essentially the same thing with only a small variation from one to another. With the invention, the best one or two libraries are included automatically. If software developers truly need a derivative of the automatically included functions, then they can still create one and add it to the user function library and utilize it in the same manner as any other user-supplied function.

Another feature of the invention is that the Software Development Program simplifies the creation of dialog boxes. Prior software development programs make dialog box construction fairly complex and require software developers to understand dozens of programming elements to create dialog boxes. With the invention, simple dialog boxes can be created quickly. Although they may lack the visual complexity of customized GUIs, dialog boxes created with the invention function logically and are easy to create.

Another feature of the invention is that the Software Development Program includes a streamlined Editor. The interface of the Editor uses a tree structure (which is popular with other software development programs such as Visual Basic and C++) in order to categorize and group code segments into a logical and intuitive structure.

Other features of the invention include that the Compiler consists of one file, requires no installation, and can run under Microsoft Windows 2000 or XP operating systems.

Automatic Source Code Control

A feature of the invention is that the Software Development Program produces Editable Executable Files, which are editable by the Software Development Program. Prior software development programs require software developers to manage Source Code separately from Object Code. The invention allows software developers to directly edit the Executable Files that they create. In other words, the invention creates Editable Executable Files. As a result, problems with source code control are eliminated, since software developers no longer have to worry about which version of Source Code created which version of Object Code. In addition, the invention allows software developers to password protect the Executable Files that they create, thereby prohibiting others from editing the Executable Files without the password.

Advantages

Affordable

Advantages of having an affordable Software Development Program include, but are not limited to, the following. Software development programs such as Microsoft Visual Basic, Microsoft Visual C++, and Borland C++ range in price from about $100 for entry-level products to over $2000 for "enterprise" products. Because the invention's Software Development Program is distributed for free (subject to the license agreement), software developers can avoid the barrier to entry created by other software development programs. Also, there is no need to worry about installing the Software Development Program on multiple computers, which is typically prohibited by software licenses of other software development programs.

Simple But Powerful Programming Language

Advantages of having a simple but powerful programming language include, but are not limited to, the following. Because the Programming Language has a simple syntax and a familiar tree structure, it is easy for software developers to learn. Most software development products on the market today require a significant amount of training and experience in order for a software developer to achieve proficiency and be able to produce good software. Because the invention's Software Development Program is configured with automatically included libraries, routine programming tasks can be completed quickly and easily. For example, a simple dialog box that displays a message can be written in one line of Source Code. Also, the Software Development Program is one file and fits on a floppy disk, which allows software developers to have all the tools they need on a single floppy disk in order to debug an Executable File. The Programming Language's functions, operators, and statements are defined on the OZEXE web site (http://help.ozexe.com/).

Automatic Source Code Control

Advantages of having automatic source code control include, but are not limited to, the following. With automatic source code control, clients and software developers no longer have to worry about which set of Source Code files created which Object Code files. Automatic source code control is achieved because the invention's Software Development Program creates Editable Executable Files. The Editable Executable Files contain both the Object Code needed by the computer and the Source Code (including independent function libraries) needed by the software developer. Decompilation is not involved, so the software developer's Source Code comments are preserved in the Editable Executable Files.

In accordance with the previous summary, the objects, features, and advantages of the present invention will become apparent to one skilled in the art from the subsequent description and the appended claims taken in conjunction with the accompanying drawings.

DETAILED DESCRIPTION OF THE INVENTION, INCLUDING THE PREFERRED EMBODIMENT

In the following detailed description of the invention, reference is made to the accompanying drawings, which form a part hereof, and in which are shown, by way of illustration, specific embodiments in which the invention may be practiced. It is to be understood that other embodiments may be utilized, and structural changes may be made without departing from the scope of the present invention.

The Software Development Program of the present invention is called OZEXE. OZEXE was created with MS Visual C++v6.0 and runs on MS Windows 2000 and MS Windows XP operating systems. OZEXE could be written in other programming languages and could be ported to other operating systems such as Linux, Mac OS, or UNIX.

Figure 4:
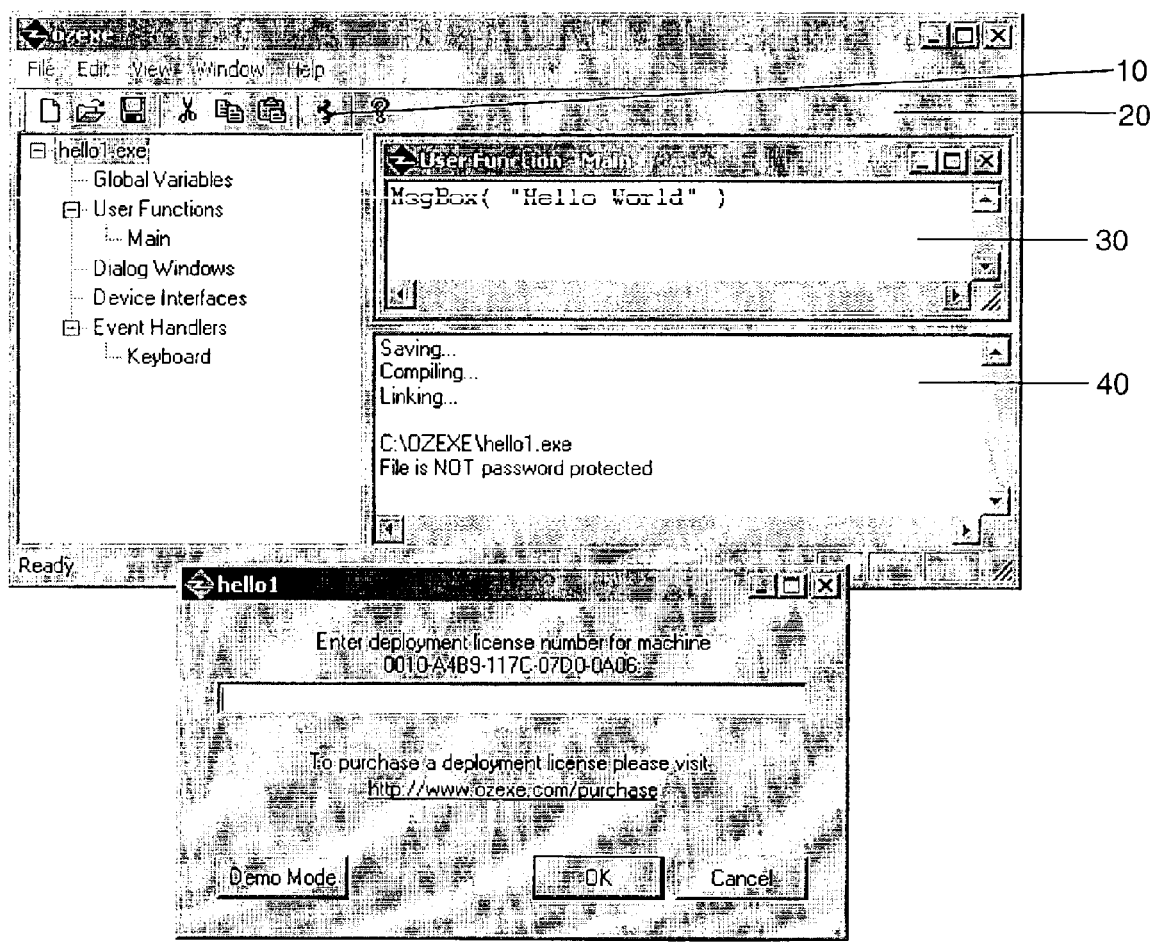
FIG. 4 shows successful compilation and operation of the resultant Editable Executable File.

Programs are created with OZEXE as follows. Referring now to FIG. 4. Source Code is created in an Editing Window 30. When a user clicks the Run Icon 10 on the Toolbar 20, OZEXE performs the following steps. First, the Source Code is saved. It is important to save the source code before compiling so that a saved version of the source code exists whether or not compilation completes successfully. Second, the Source Code is compiled into Object Code. The Source Code is recompiled entirely each time the Run Icon 10 is clicked. The compilation process involves no pre-compiling and no incremental compiling. Third, the object code is linked. Fourth, an Executable File is created (such as hello1.exe) that contains the Source Code, Executable Shell, and Object Code. If a user wishes to edit, change, or debug the resultant Executable File, the user can simply open the Executable File directly with OZEXE (e.g. accessing the "File" menu, choosing the "Open" option, and selecting the "hello1.exe" file).

Figure 5:
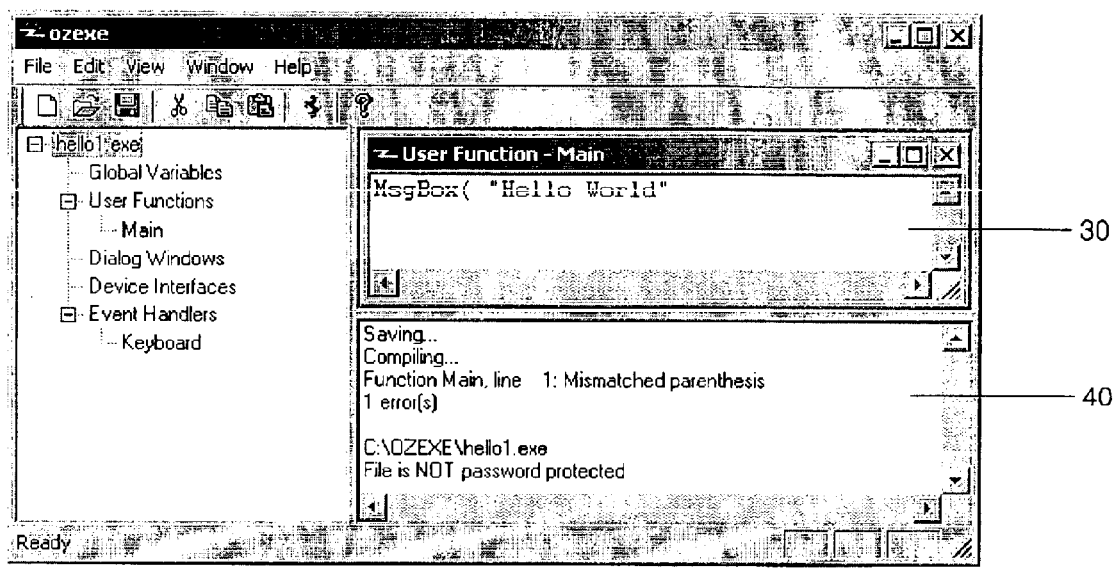
FIG. 5 shows unsuccessful compilation.

The process of compilation is now discussed in more detail with reference to FIG. 4 and FIG. 5. OZEXE creates an Executable File regardless of whether or not compilation completes successfully. During compilation, the Output Window 40 of OZEXE displays system messages (including error and status messages). If the source code compiles successfully, the resultant Executable File runs. Successful compilation is shown in FIG. 4.

Figure 1:
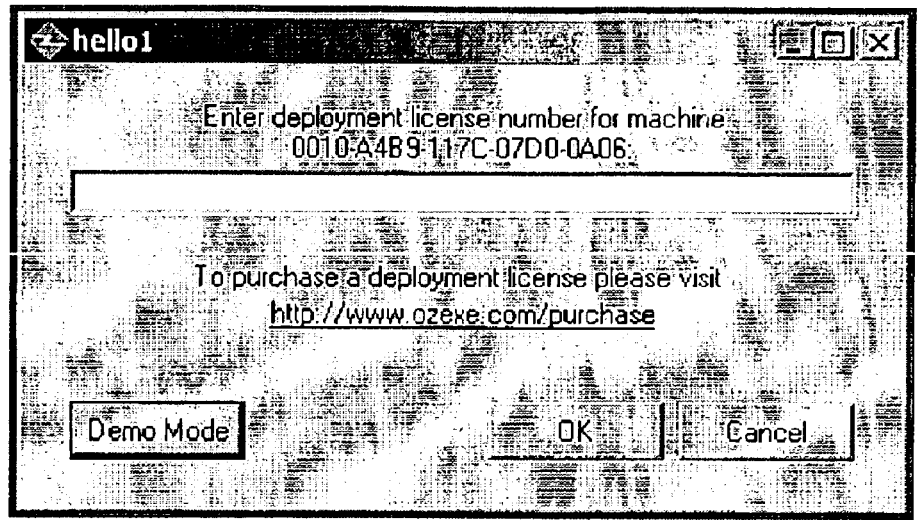
FIG. 1 shows the Notice Screen for hello1.exe, a sample unlicensed Editable Executable File created with the Software Development Program.
Figure 2:
FIG. 2 shows the output of hello1.exe running in Demo Mode.
Figure 3:
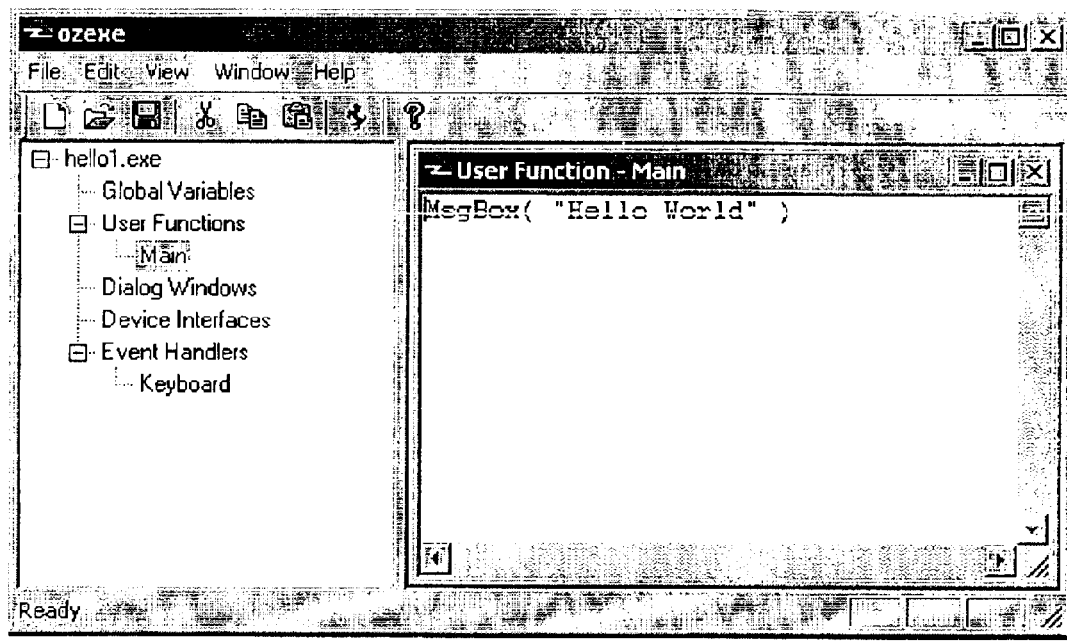
FIG. 3 shows the Editable Executable Files hello1.exe opened in the Software Development Program. The toolbar is shown on the left portion of the display, and the Source Code for hello1.exe is shown on the right portion of the display.

If, however, the Source Code does not compile successfully, the Executable File will be created but cannot run due to the compilation errors. Unsuccessful compilation is shown in FIG. 5. In the Editing Window 30, note that the MsgBox function call is missing the final parenthesis mark. The Compiler reports the mismatched parenthesis error in the Output Window 40. The Source Code has been preserved in the hello1.exe Executable File, but if you attempt to run that Executable File (for example, by double clicking on it from Windows Explorer), nothing happens (except that the Notice Screen, as shown in FIG. 1, appears). In other words, the user-created Source Code, since it has not compiled properly into Object Code will not run in the resultant Editable Executable File. But the Executable File still runs (to the extent described above) because the Compiler automatically includes an Executable Shell (along with Source Code and Object Code) in the resultant Editable Executable File. It is this Executable Shell that has the automatically included common library functions, interfaces, Notice Screen code, and the like.

The process of saving the Source Code is now discussed in more detail. The process of saving the source code involves the additional step of encrypting the Source Code. The preferred encrypting method is TEA, the Tiny Encryption Algorithm, which was developed by David Wheeler and Roger Needham at the Computer Laboratory of Cambridge University. Encrypting the Source Code provides a layer of security for the Source Code. For additional security, Executable Files can also be password protected.

In the preferred embodiment, the Source Code is not compressed (or compacted) during the saving process.

In another embodiment, the source code is compressed. Compressing the source code produces smaller Executable Files but adds time to the overall process of creating Executable Files. In this embodiment, the Software Development Program includes software procedures to compress and decompress the Source Code.

In another embodiment, only the portion of Source Code with comments in it is saved into the Executable File. When saving the Source Code into the Executable File, it is not necessary to include all of the Source Code. In this embodiment, the Compiler includes software procedures to decompile (a decompiler) the portion of Source Code without comments.

In another embodiment, Executable Files created by the Software Development Program also include a copy of the Software Development Program itself. In this way, the resultant Executable File includes everything needed in order for users to run or edit the Executable File.

Other embodiments include the following. The Compiler can be replaced with an Interpreter, and the Editor can be separated from the Software Development Program so that there are two separate programs, one for compiling/interpreting, the other for editing.

I claim:

1. A computerized method for Creating Editable Executable Files with a Software Development Program, said method comprising:

Creating an Executable Shell;

Saving Source Code;

Transforming said Source Code into Object Code;

Writing said Executable Shell, said Source Code, and said Object Code into a single Executable File.

2. The method of claim 1, wherein said Saving also includes Encrypting said Source Code.

3. The method of claim 1, wherein said Saving also includes Compressing said Source Code.

4. The method of claim 1, wherein said Saving also includes Encrypting and Compressing said source Code.

5. The method of claim 1, wherein said Transforming is Compiling.

6. The method of claim 1, wherein said Transforming is Interpreting.

7. The method of claim 1 further comprising:

Writing said Software Development Program into said Executable File.

8. A computerized method for Editing Editable Executable Files with a Software Development Program, said method comprising:

Opening an Executable File having an Executable Shell, Source Code, and Object Code;

Extracting said Source Code from said Executable File;

Editing said Source Code with said Software Development Program.

9. The method of claim 8, wherein said Extracting also includes Decrypting said Source Code.

10. The method of claim 8, wherein said Extracting also includes Decompressing said Source Code.

11. The method of claim 8, wherein said Extracting also includes Decrypting and Decompressing said Source Code.

12. The method of claim 8, wherein said Software Development Program is a Compiler.

13. The method of claim 8, wherein said Software Development Program is an Interpreter.

14. The method of claim 8 further comprising:

Opening an Executable File having a Software Development Program.

15. A system produced by the method of claim 1, said system comprising:

A computer programmed to run an Executable File for any useful purpose, wherein said Executable File displays a notice when running in unregistered mode.

16. A computerized method for Creating and Editing Editable Executable Files with a Software Development Program, said method comprising:

Creating an Executable Shell;

Saving Source Code;

Transforming said Source Code into Object Code;

Writing said Executable Shell, said Source Code, and said Object Code into a single Executable File;

Opening said Executable File having said Executable Shell, said Source Code, and said Object Code;

Extracting said Source Code from said Executable File;

Editing said Source Code with said Software Development Program.

17. A system produced by the method of claim 16, said system comprising:

A computer programmed to run a Software Development Program for Creating and Editing Executable Files by:

Creating an Executable Shell;

Saving Source Code;

Transforming said Source Code into Object Code;

Writing said Executable Shell, said Source Code, and said Object Code into a single Executable File;

Opening said Executable File having said Executable Shell, said Source Code, and said Object Code;

Extracting said Source Code from said Executable File;

Editing said Source Code with said Software Development Program.

18. A method of Distributing a Software Development Program, said method comprising:

Having a Software Development Programs that creates Executable Files that display a Notice Screen when run in an unregistered mode;

Making the Software Development Program available for downloading from a Communications Network;

Selling licenses for computers on which Executable Files created with the Software Development Program run.

19. A system for Creating and Editing Editable Executable Files with a Software Development Program, said system comprising:

A computer programmed for:
Creating an Executable Shell;
Saving Source Code;
Transforming said Source Code into Object Code;
Writing said Executable Shell, said Source Code, and said Object Code into a single Executable File;
Opening said Executable File having said Executable Shell, said Source Code, and said Object Code;
Extracting said Source Code from said Executable File;
Editing said Source Code with said Software Development Program.

20. A system for Creating and Editing Editable Executable Files with a Software Development Program, said system comprising:

A programmable computer having:
Means for creating an Executable Shell;
Means for saving Source Code;
Means for transforming said Source Code into Object Code;
Means for writing said Executable Shell, said Source Code, and said Object Code into a single Executable File;
Means for opening said Executable File having said Executable Shell, said Source Code, and said Object Code;
Means for extracting said Source Code from said Executable File;
Means for editing said Source Code with said Software Development Program.

21. A system having an Editable Executable File, said system comprising:

A computer programmed to run said Editable Executable File, wherein said Editable Executable File comprises an Executable Shell, Source Code, and Object Code.

22. A computer-readable medium having computer-executable instructions for Creating Editable Executable Files, said method comprising:

Creating an Executable Shell;
Saving Source Code;
Transforming said Source Code into Object Code;.
Writing said Executable Shell, said Source Code, and said Object Code into a single Executable File.

23. A computer-readable medium having computer-executable instructions for Editing Editable Executable Files, said method comprising:

Opening an Executable File having an Executable Shell, Source Code, and Object Code;
Extracting said Source Code from said Executable File;
Editing said Source Code.

* * * * *